(12) United States Patent
Duquesne et al.

(10) Patent No.: US 10,721,865 B2
(45) Date of Patent: Jul. 28, 2020

(54) COMBINE HARVESTER WITH LATERAL MOTION OF THE GRAIN PAN

(71) Applicant: CNH Industrial America LLC, New Holland, PA (US)

(72) Inventors: Frank R. G. Duquesne, Zwevegem (BE); Curtis Hillen, Lititz, PA (US); Paul E. M. Snauwaert, Moerkerke (BE)

(73) Assignee: CNH Industrial America LLC, New Hlland, PA (US)

( * ) Notice: Subject to any disclaimer, the term of this patent is extended or adjusted under 35 U.S.C. 154(b) by 193 days.

(21) Appl. No.: 15/756,340

(22) PCT Filed: Aug. 26, 2016

(86) PCT No.: PCT/US2016/048932
§ 371 (c)(1),
(2) Date: Feb. 28, 2018

(87) PCT Pub. No.: WO2017/040261
PCT Pub. Date: Mar. 9, 2017

(65) Prior Publication Data
US 2018/0242522 A1 Aug. 30, 2018

Related U.S. Application Data

(60) Provisional application No. 62/211,442, filed on Aug. 28, 2015.

(51) Int. Cl.
*A01D 41/127* (2006.01)
*A01F 12/44* (2006.01)

(52) U.S. Cl.
CPC ........ *A01D 41/1276* (2013.01); *A01F 12/444* (2013.01); *A01F 12/446* (2013.01); *A01F 12/448* (2013.01)

(58) Field of Classification Search
CPC .............. A01D 57/282; A01D 41/1276; A01D 41/1271; A01D 41/127; A01D 41/1273; A01D 75/28; A01F 12/448; A01F 12/446; A01F 12/44; A01F 12/38; A01F 12/56; G01B 7/08; G01F 23/263; B07B 1/42
See application file for complete search history.

(56) References Cited

U.S. PATENT DOCUMENTS 4,355,647 A * 10/1982 Heidjann ............. A01D 75/282
460/101
4,557,276 A   12/1985 Hyman et al.
4,598,718 A * 7/1986 Glaubitz ............. A01D 75/282
209/416
(Continued)

FOREIGN PATENT DOCUMENTS

DE    19908696 C1   10/2000
EP    2550851 A1   1/2013
(Continued)

*Primary Examiner* — Arpad Fabian-Kovacs
(74) *Attorney, Agent, or Firm* — Patrick Sheldrake

(57) ABSTRACT

A combine harvester includes one or more threshing rotors (5) mounted in the harvester, a grain pan (7) and a set of sieves (8), and a drive mechanism configured to drive a longitudinal reciprocating motion of the grain pan (7) and superimpose a lateral reciprocating motion component on the longitudinal reciprocating motion.

13 Claims, 6 Drawing Sheets

(56) References Cited

U.S. PATENT DOCUMENTS

| | | | | |
|---|---|---|---|---|
| 4,751,932 A | * | 6/1988 | Busboom | A01D 75/282 460/9 |
| 4,770,190 A | * | 9/1988 | Barnett | A01F 12/446 209/394 |
| 5,134,379 A | * | 7/1992 | Maher | G01V 3/088 324/663 |
| 5,529,537 A | * | 6/1996 | Johnson | A01D 41/1275 460/119 |
| 5,708,369 A | * | 1/1998 | Horn | G01F 23/266 324/373 |
| 6,119,442 A | * | 9/2000 | Hale | A01D 41/1277 56/10.2 H |
| 7,927,199 B2 | | 4/2011 | Adamson et al. | |
| 8,939,829 B2 | * | 1/2015 | Murray | A01F 12/448 460/101 |
| 8,951,105 B2 | | 2/2015 | Murray et al. | |
| 2005/0282601 A1 | * | 12/2005 | Duquesne | A01D 75/282 460/101 |
| 2006/0229119 A1 | | 10/2006 | Wamhof et al. | |
| 2013/0172057 A1 | * | 7/2013 | Farley | A01D 75/282 460/5 |
| 2015/0342119 A1 | * | 12/2015 | Duquesne | A01F 12/38 700/280 |
| 2016/0198629 A1 | * | 7/2016 | Duquesne | A01D 41/1276 701/36 |
| 2016/0366821 A1 | * | 12/2016 | Good | A01D 41/1271 |
| 2017/0150680 A1 | * | 6/2017 | Moutton | A01F 12/44 |

FOREIGN PATENT DOCUMENTS

| | | | | |
|---|---|---|---|---|
| GB | 2072050 A | | 9/1981 | |
| JP | H05-184234 | | 7/1993 | |
| JP | 2012205574 A | * | 10/2012 | A01F 12/32 |
| JP | 2018117573 A | * | 8/2018 | A01F 12/32 |
| RU | 2073411 C1 | | 3/1997 | |
| RU | 2010114616 A | | 1/2013 | |
| WO | 2014093922 A2 | | 6/2014 | |
| WO | 2015004268 A1 | | 1/2015 | |

\* cited by examiner

COMBINE HARVESTER WITH LATERAL MOTION OF THE GRAIN PAN

BACKGROUND OF THE INVENTION

1. Field of the Invention

The present invention is related to combine harvesters with one or more threshing rotors.

2. Description of the Related Art

Agricultural combine harvesters comprise threshing rotors that rotate with respect to concave gratings in order to separate grains from residue crop materials such as stalks and leaves. Threshing rotors are arranged transversally or longitudinally with respect to the driving direction of the harvester. Some hybrid type harvesters have transverse as well as longitudinal threshing rotors. Combines equipped only with longitudinal threshing rotors are also known as axial flow combines. Combines provided with a single axial flow rotor or with twin rotors are known in the art. One advantage of this type of combine harvester is the fact that two functions are performed by the rotors: threshing of the crops and transport of the residue towards the back of the harvester.

However, a problem that is inherent to axial flow combines is the fact that the grains and light chaff which fall through the concave are not evenly spread across the width of the harvester. This material falls onto a grain pan from where it is further transported towards a set of sieves, where the grains are separated from light chaff not previously removed in the threshing process. The grain/chaff mixture falling through the concaves tends to accumulate in distinct areas of the grain pan underneath the rotor or rotors. This leads to uneven profiles of material on the grain pan, for example in the form of an inverted W-profile in the case of a twin-rotor combine or an inverted V profile in the case of a single rotor. This profile is maintained as the material is transported onto the sieves, leading to a less than optimal sieve efficiency.

When working on side slopes, the problem becomes worse, with material accumulating on the downward side of the grain pan. One known solution to counter the effect of side slopes on the distribution of material on the grain pan is the provision of longitudinal partitions on the grain pan, the partitions being separated by longitudinally arranged dividers in the form of upright separation walls. These partitions are however counteracting any redistribution of the above-cited W or V profiles that are purely a consequence of the axial position of the threshing rotors. The side slope problem is equally tackled by existing harvesters provided with a self-levelling grain pan and/or self-levelling sieves or sieve partitions. These systems are however technically complex, expensive and vulnerable to technical malfunctioning.

SUMMARY OF THE INVENTION

The invention is related to a combine harvester with a laterally moving grain pan. The present invention is related to a combine harvester including one or more threshing rotors mounted in the harvester, a grain pan and a set of sieves, wherein the grain pan comprises a drive mechanism configured to drive a longitudinal reciprocating motion of the grain pan, and further capable of superimposing on said longitudinal reciprocating motion a lateral reciprocating motion component, i.e. a motion component directed towards the sides of the harvester. The grain pan can lack longitudinal partitions. The invention is equally related to a method for controlling the lateral grain pan motion based on a measurement of the grain portion of a stratified grain/chaff layer advancing on the grain pan.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Preferred embodiments will now be described with reference to the drawings. The detailed description is not limiting the scope of the invention, which is defined only by the appended claims.

Figure 1:
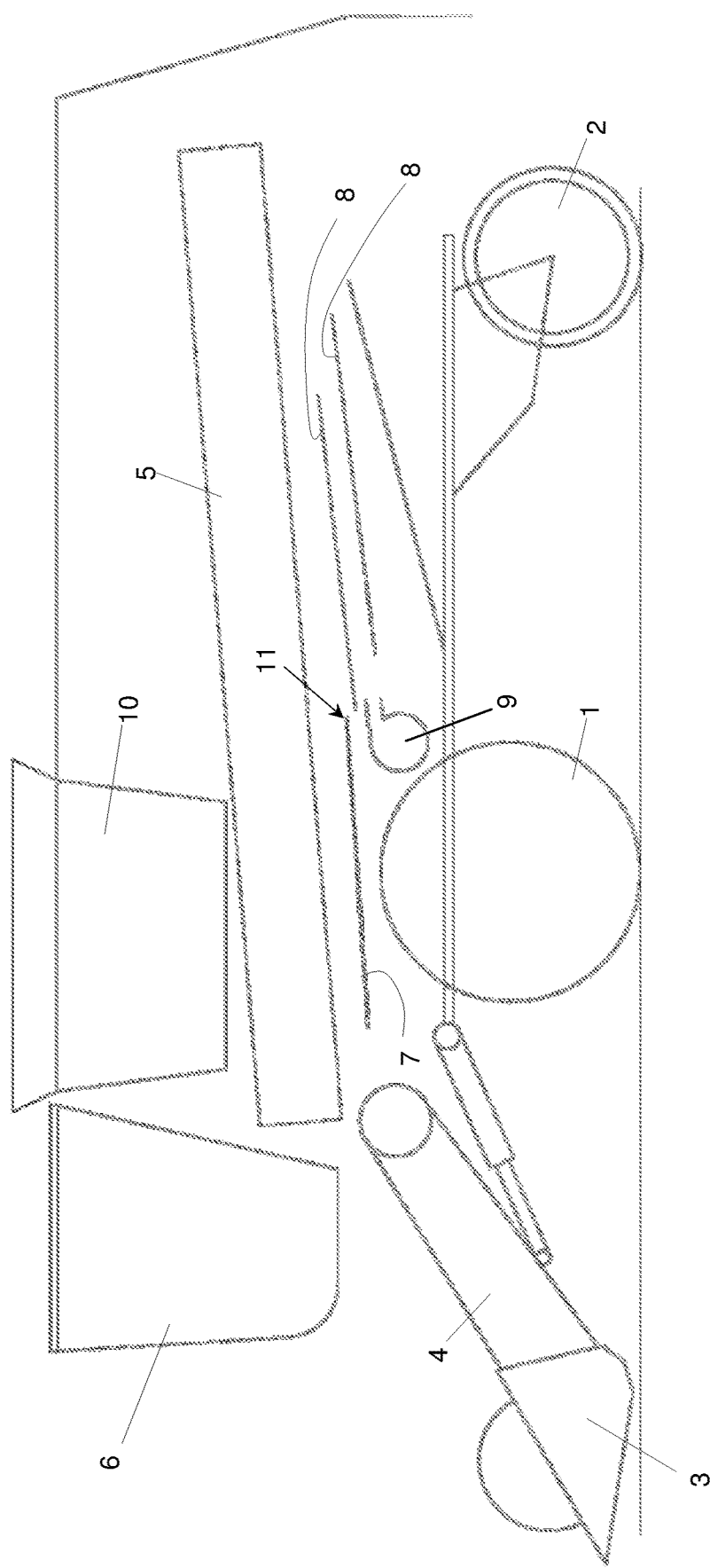
FIG. 1 is a side view of an embodiment of a combine harvester equipped with longitudinally arranged threshing rotors according to one embodiment of the present invention.

FIG. 1 shows the main components of an axial flow combine harvester, mounted on front and rear wheels 1 and 2. Crops are cut from the field by the header assembly 3, and supplied by the feeder 4 to a single rotor or a twin set of threshing rotors 5, arranged along a longitudinal direction of the harvester and tilted slightly upward with respect to the horizontal. The driver's cabin 6 is indicated, as well as the cleaning arrangement, comprising a grain pan 7, a set of sieves 8 and a blower 9 for blowing light residue material towards the back of the harvester. Grains fall through the sieves and are transported by an assembly of augers and a grain elevator (not shown) to a grain tank 10. It should be appreciated that while an axial flow combine harvester with one or more rotors arranged the longitudinal direction of the harvester is shown, the present invention can be applied to other types of combine harvesters such as transverse or hybrid combine harvesters.

Figure 2:
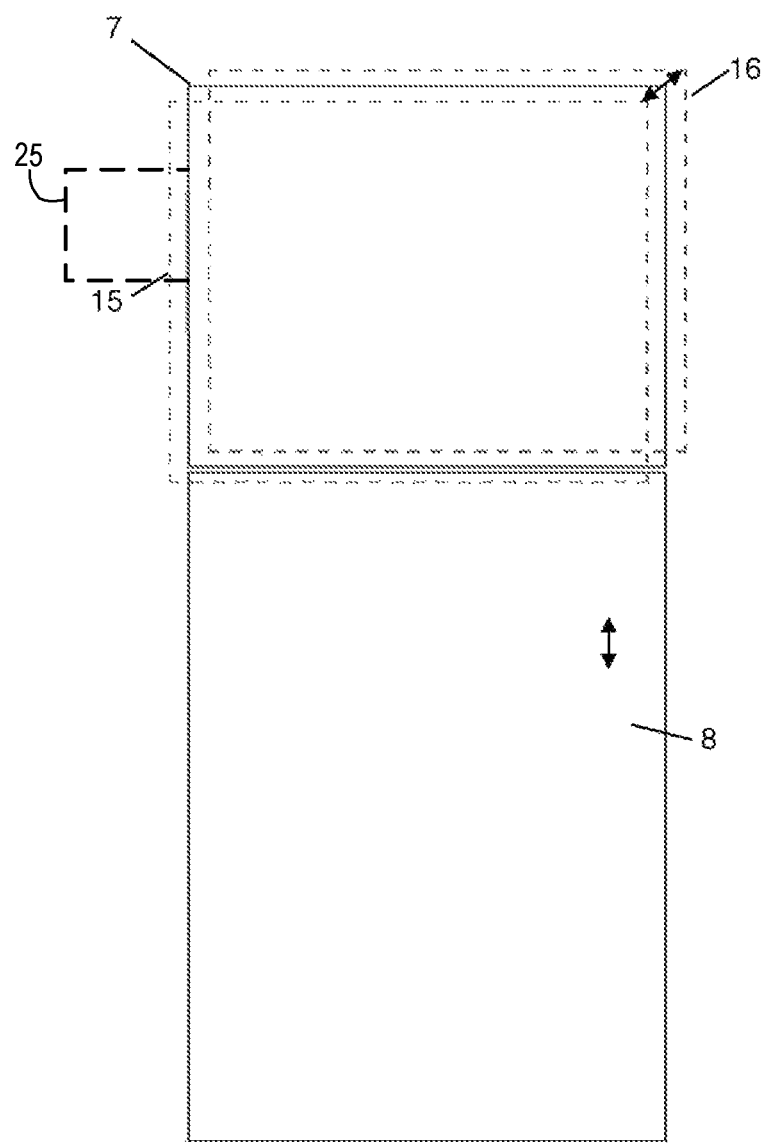
FIG. 2 illustrates the reciprocating motion of a grain pan in a harvester according to the present invention.

The sieves 8 are coupled to an actuating mechanism configured to actuate a reciprocating motion of the sieves in the longitudinal direction of the harvester. Usually this is a circular motion in a vertical plane, actuated by a crank mechanism. This feature is known in the art. The motion of the sieves causes the separation of grains from any remaining residue that has not been blown back by the blower 9. According to the invention, the grain pan 7 is coupled to an actuating mechanism 25, which may also be referred to as a "drive mechanism," configured to actuate a reciprocating motion of the grain pan in the longitudinal direction of the harvester, i.e. similar to the motion of the sieves, and further configured to superimpose a lateral reciprocating motion component onto said longitudinal motion of the grain pan, so that the grain pan is capable of undergoing a combined fore-aft and sideways oriented reciprocating motion, as illustrated in FIG. 2: the grain pan is capable of moving between positions 15 and 16 according to a sideways reciprocating motion illustrated by the arrows. While one grain pan 7 is shown, the grain pan 7 can be one of multiple grains pans or a multiple-part grain pan, as is known.

The actuating mechanism 25 applied to the grain pan 7 may be brought into practice according to known systems for actuating a reciprocating motion in a longitudinal direction combined with a lateral motion component. WO-A-2014/093922 for example describes a side-shaking actuating system applied to the sieves of a combine harvester. This system may be applied without changes to the grain pan 7 in a harvester according to the invention. Control of these systems allows a control of the amplitude of the lateral motion component imposed on the grain pan to thereby control the amplitude and direction of the combined reciprocating motion. It should be appreciated that the actuating mechanism 25 applied to the grain pan 7 may also be applied to the one or more of the sieves 8, if desired.

The grain pan 7 in a harvester according to one embodiment of the invention lacks longitudinal partitions separated by dividers, so as not to impede the uniformization of the V or W profile. Applying a lateral motion component to a grain pan 7 that is free of longitudinal partitions results in an improved distribution of the grains on the grain pan, before the grains are transferred to the sieves 8. Any reciprocating motion of the grain pan (also the fore-aft motion as applied in present day harvesters) is configured to obtain a stratification of the layer consisting mainly of grains and light chaff, as a consequence of the difference in density between grains and chaff: the heavier grains migrate to the bottom of the layer, with the lighter chaff accumulating at the top. As the grain/chaff layer approaches the exit edge 11 of the grain pan 7, the stratification is preferably as complete as possible, which facilitates the sieving process and the removal of chaff by the blower 9. The V or W shaped profile referred to above applies to the complete thickness of the grain/chaff layer at various sections of the grain pan upstream of the exit edge 11. The lateral motion component applied to the grain pan will work towards removing the profile, i.e. rendering the distribution of grains and chaff more uniform across the width of the grain pan, as the layer approaches the exit edge 11.

From tests performed on twin rotors mounted on a flat terrain (zero side slope), the inventors have found that the sideways motion of the grain pan is capable of rendering the distribution of the grain portion of the stratified layer uniform before the distribution of the complete layer is rendered uniform. In other words, uniformization of the grain layer happens faster than uniformization of the chaff portion. This is a beneficial finding in that it allows to put into a place a control algorithm based directly on a measurement of the grain portion of the stratified layer. As the grain portion is uniform faster than the complete layer, uniformization of the complete layer thickness is not a necessary requirement, which allows to optimize the required size of the grain pan and/or the required amplitudes of the side-ways motion components in order to obtain a pre-determined degree of uniformization.

Figure 3:
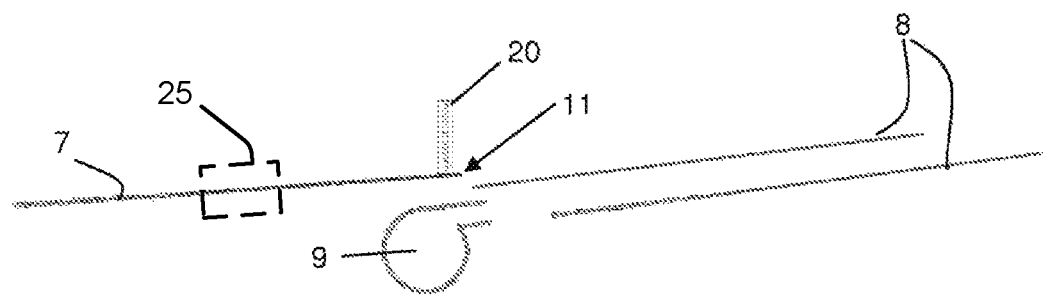
FIG. 3 illustrates a sensor suitable for measuring the thickness of the grain portion of a stratified grain/chaff layer on the grain pan.
Figure 4:
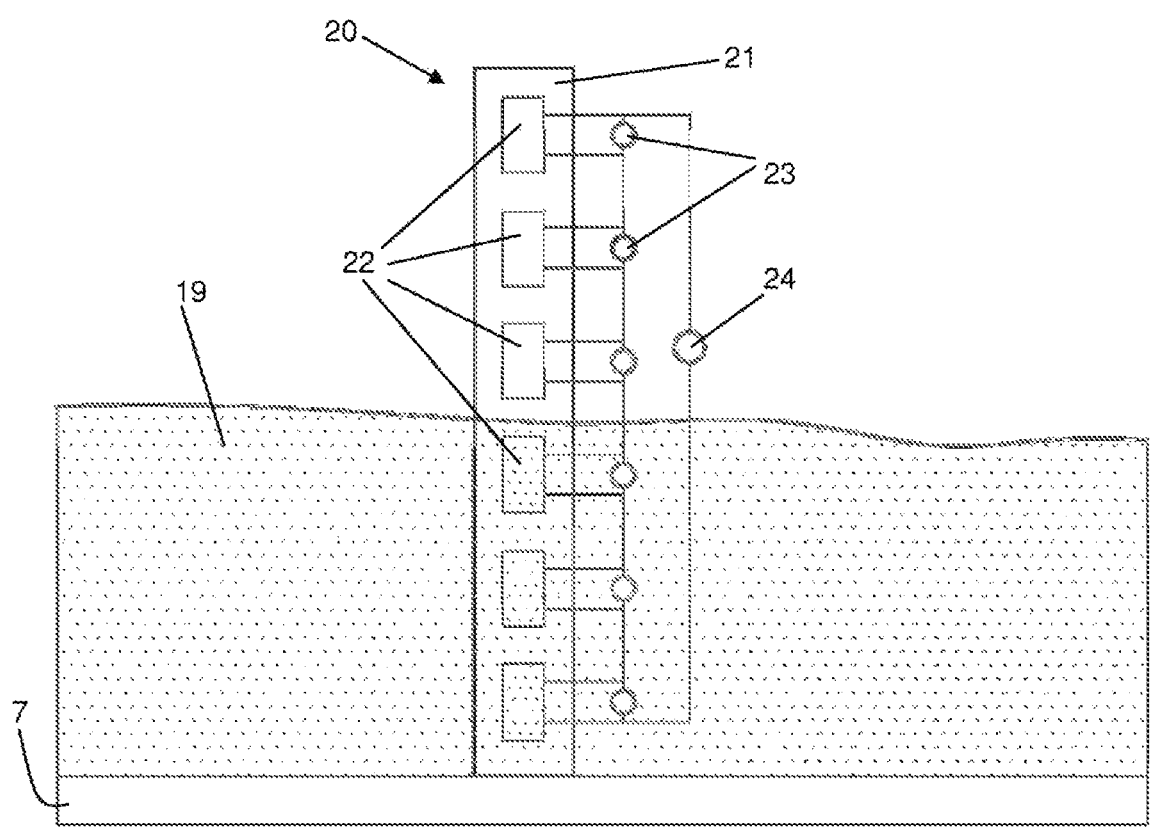
FIG. 4 shows a detailed view of the sensor shown in FIG. 3.

According to one embodiment, a combine according to the invention is equipped with one or more sensors that are capable of measuring the thickness of the grain portion of a stratified layer on the grain pan. FIG. 3 illustrates a suitable sensor 20, mounted on the surface of the grain pan 7. The sensor 20 is mounted so that a grain/chaff layer moves past and in contact with at least one side of the sensor, such as at least along and in contact with both sides. An enlarged view of the sensor 20 is shown in FIG. 4, which also shows the level of a layer 19 of a grain/chaff mixture that is advancing on the grain pan 7. The sensor 20 comprises a vertical support structure 21, which is a tower-shaped structure, preferably in the form of a flat element such as a rigid rectangular strip, mounted upright on the surface of the grain pan 7, parallel to the direction of movement of the grain/chaff layer. Multiple sensor elements 22 are attached to the support structure 21, and arranged in a vertical stack, i.e. one above the other and spaced apart by a preferably (but not necessarily) constant distance. Only six sensor elements 22 are shown in FIG. 4. However the amount of sensor elements is not defined, and may be determined on the basis of the type of sensor elements used, their size and the expected or allowable maximum layer thickness that is to be carried on the grain pan 7. For example, a sensor tower 20 with a height of about 20 cm comprising 12 regularly spaced sensor elements (i.e. spaced apart about 1.5 cm) is believed to be suitable for most purposes. According to an embodiment, the size of one sensor element 22 is about the size of one grain of the crop material that is processed in the harvester.

The sensor elements 22 are configured to measure an electrical property that changes as a function of the immediate surroundings of the sensor element. The sensor elements 22 are furthermore configured to be read out independently from each other. In other words, each sensor element 22 is connected to a separate read-out means 23. The sensor elements may be powered by a single power source 24 as shown in the embodiment of FIG. 4 or by separate power sources (one for each sensor element for example). The read-out means 23 and power source 24 are shown schematically in FIG. 4 to illustrate their connectivity with respect to the sensor elements 22, and must not be interpreted as being necessarily a part of the sensor 20. The power means could however be incorporated in the sensor (e.g. a battery). The read-out means 23 must be understood to include a means for measuring the electrical property (which may or may not be incorporated in the sensor) and a means for interfacing the measurement means with an operator, for showing the result of the measurement and allowing the operator to change settings. The interfacing means may typically be present in the combine driver's cabin. In practice, the read-out and power means can be realized according to any appropriate sensor technology known in the art. Wiring from the sensor elements 22 to the power source(s) and read-out means can be incorporated in the vertical support structure 21 which may comprise an interface for connecting said wiring to suitable power and read-out devices situated in or operable from the driver's cabin of the combine.

The sensor elements 22 are capable of distinguishing between a first condition where the sensor is in contact with air and a second condition where the sensor is in contact with a layer of a grain/chaff mixture. As the sensor elements are configured to be read out independently from each other, they are equally capable of distinguishing between multiple layers in a stratified layer of the grain/chaff mixture, provided that the sensor elements have the appropriate sensitivity required for making that distinction. For example, when capacitive sensor elements are used, the elements must be capable of detecting a identifiable change in the capacity when the sensor is in contact with a layer of grain compared to when the sensor is in contact with a layer of chaff residue material.

Besides capacitive sensors, other types of sensors may be used as the sensor elements 22, such as, for example, eddy current sensors, radar sensors, ultrasonic sensors, potentiometers, load cells, etc. Existing types of commercially available sensors may be used where appropriate. Capacitive sensor elements 22 that are suitable for use in a sensor 20 of the invention are for example cylindrical sensor types CS005 or CS02 from Micro-Epsilon. When cylindrical sensor elements are used, they are preferably mounted with their longitudinal axis parallel to the direction of movement of the grain/chaff layer, i.e. perpendicular to the stack of sensor elements 22. Because cylindrical sensor elements may form a larger obstruction to the advancing layer, a preference goes out to flat sensor elements, such as the CSG02FL-CRm1,4 from Micro-Epsilon. Flat sensor elements are mounted with their flat side attached to the support structure 21 so as to form less of an obstruction for the advancing layer. The sensor elements, be it cylindrical, flat or otherwise, may also be incorporated in the thickness of the support structure 21, e.g. in a support structure provided with cavities into which the cylindrical or flat sensor elements are fitted. According to one embodiment, the vertical support 21 consists of or comprises a PCB board that incorporates the sensor elements 22 as well as the conductors that connect the sensor elements to the read-out and power means 23/24. In the case of flat sensor elements especially, this provides a way of producing a thin vertical sensor tower with perfectly flat sidewalls which therefore represents a minimum obstruction for the grain/chaff layer 19 as it moves through the combine's cleaning arrangement.

Figure 5:
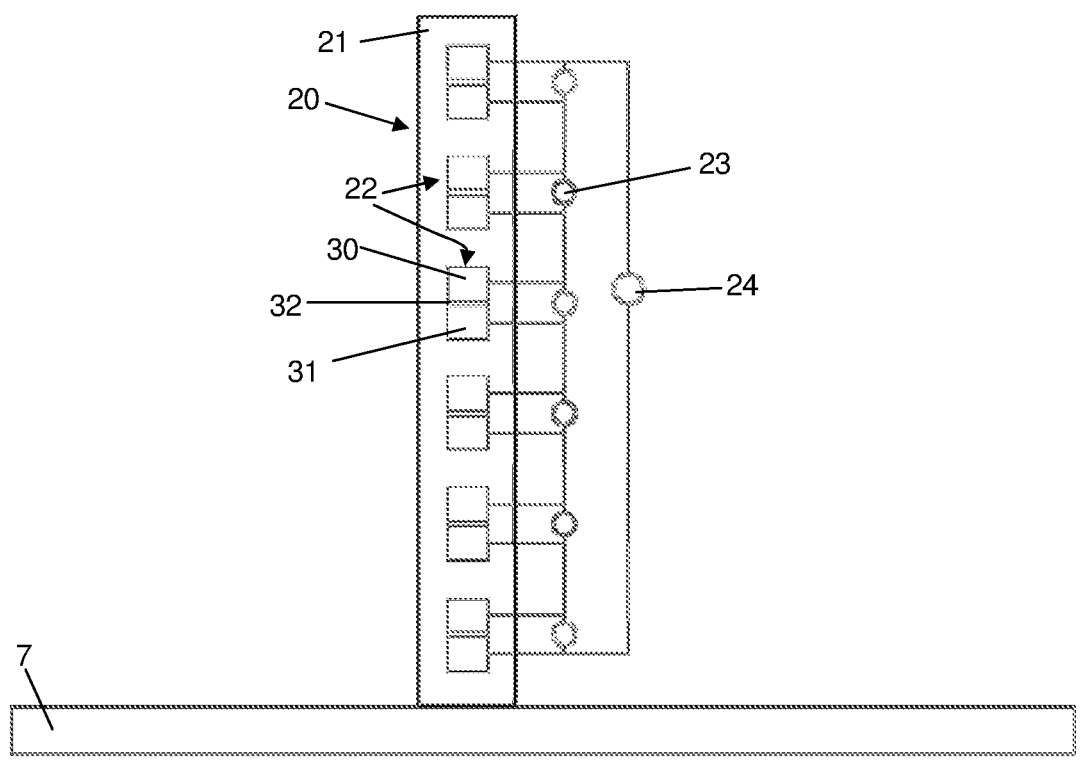
FIG. 5 illustrates an embodiment of a sensor provided with capacitive sensor elements that have a large contact area with a passing grain/chaff layer.

FIG. 5 shows one possible embodiment of a sensor 20 wherein the sensor elements 22 are capacitive sensors, comprising a planar upper electrically conductive plate 30, a planar lower electrically conductive plate 31 and a dielectric element 32 in between and in contact with the two plates, the plates being mounted in the same vertical plane when the sensor is placed on a support surface 7. In other words, the plates 30/31 are perpendicular to the grain pan 7 and parallel to the movement direction of the grain/chaff layer. When the support structure 21 is a flat strip, as in the case of FIG. 5, the conductor plates 30/31 are parallel to the support structure. The dielectric element 32 can also be flat and have the same thickness as the plates 30/31 (in the direction perpendicular to the drawings). The plates are connected to read-out means 23 configured to measure the capacity between the plates 30/31 and to a power source 24 configured to create a voltage difference between the plates 30/31. The plates 30/31 could also be mounted side-by-side instead of one above the other with the dielectric element 32 oriented vertically instead of horizontally. The planar design of the sensor elements 22 according to this embodiment ensures a large contact area with the moving grain/chaff mixture which leads to a higher sensitivity of the sensor elements as well as a more stable output value. Sensor elements 22 according to this embodiment can be incorporated in a PCB board, along with the required wiring connecting the plates 30/31 to the power and read-out means 24/23.

Figure 6A:
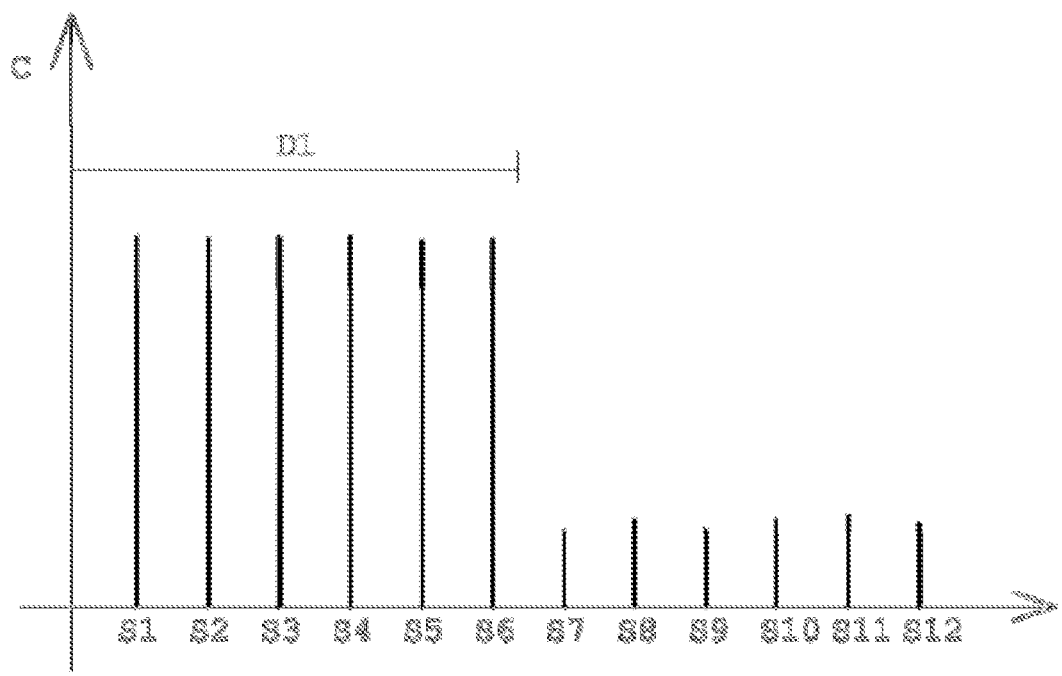
FIG. 6A shows an example of output values obtained from the sensor shown in FIG. 5 when a uniform grain/chaff layer passes by the sensor.

FIG. 6A shows a typical output from a sensor 20 when a uniform grain/chaff layer passes by the sensor, i.e. a layer wherein no stratification has taken place. The sensor is provided with 12 sensor elements S1 to S12. The vertical axis shows the electrical property that is read out by the read-out means 23, e.g. a capacity C. The horizontal axis shows the positions of the sensor elements along the height of the support structure 21. The thickness D1 of the grain/chaff layer can be estimated as the middle position between sensor elements S6 and S7 between which the sensor output changes from a given approximately constant value, corresponding to the capacity when the sensor elements are in contact with the layer to a lower value corresponding to the capacity when the sensor elements are in contact with air.

Figure 6B:
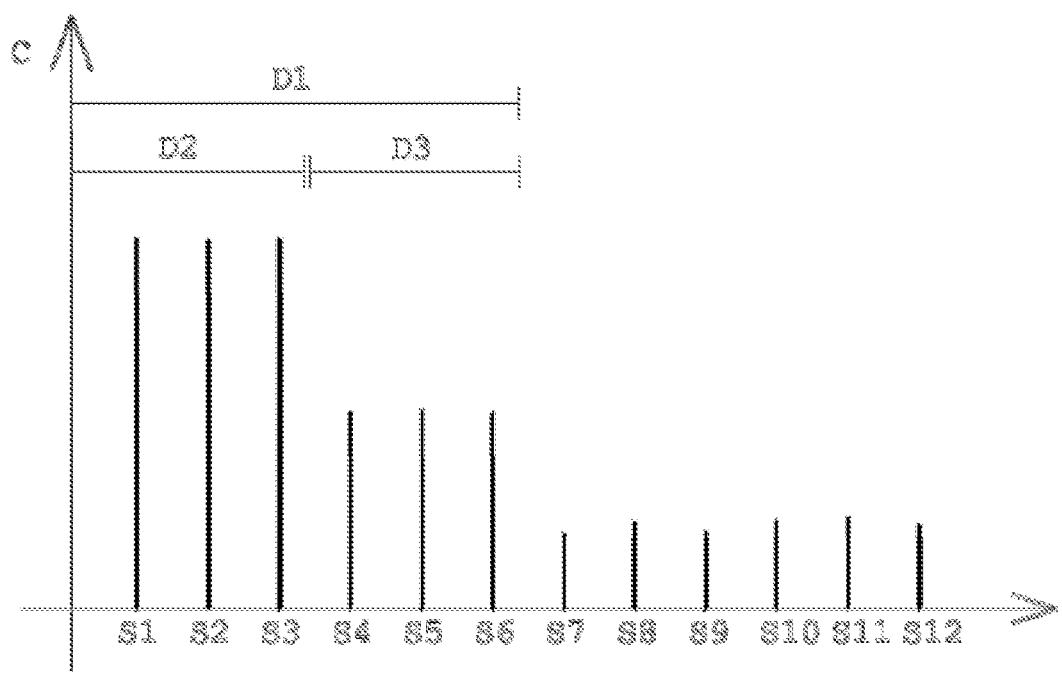
FIG. 6B shows another example of output values obtained from the sensor shown in FIG. 5 when a fully segregated grain/chaff layer passes by the sensor.

FIG. 6B shows an output from the same sensor for a fully segregated layer of the same thickness D1. The sensor elements S1 to S3 that are buried in the grain layer detect a larger capacity than the sensor elements S4 to S6 buried in the chaff layer. The detection of this change in output values allows to make an estimation of the thickness D2 of the grain layer and of the thickness D3 of the chaff layer. This distinction between grain and chaff is a direct consequence of the sensor elements S1 to S12 being readable independently from each other.

If the harvester is inclined at a side-sloped angle, the lateral motion component of the grain pan is capable not only of levelling the W or V distribution that follows from the longitudinal orientation of the threshing rotors, but also the gravity-induced accumulation of grains and chaff on the lower side of the grain pan.

The grain pan is preferably not self-levelling when the harvester is tilted in the side direction, i.e. the side-shaking capability of the grain pan is preferably the only measure taken for levelling the material on the grain pan in the case of a side slope. According to one embodiment, the sieves 8 are configured to reciprocate only in the longitudinal direction and not in the lateral direction. A combine harvester according to the invention, wherein only the grain pan 7 is capable of undergoing a lateral motion is advantageous in that the grain pan is less heavy and less technically complex than the sieves 8. The weight difference results in the lateral motion having less of an impact on the overall vibrations of the combine caused by said lateral motion. The reduced technical complexity results in the lateral motion being less likely to cause technical malfunctioning. For example the sieves comprise a large number of movable louvers comprising small parts which are vulnerable to defects caused by vibration forces. The lateral motion of the grain pan is especially advantageous in an axial flow combine harvester, given that the appearance of the profiles (e.g. W or V as referred to above), is strongest at the beginning of the threshing process, i.e. directly above the grain pan.

Possibly the sieves may be configured to be self-levelling in the side direction. The sieves may consist of a plurality of longitudinal sections which are each self-levelling individually. The harvester according to the invention that is equipped with a side-shaking but not self-levelling grain pan 7 as described above, longitudinally reciprocating but not side-shaking sieves 8, which sieves are also not self-levelling, represents an effective alternative in terms of compensating the effects of a side slope, compared to existing harvesters which have more complex and expensive solutions to this problem.

According to one possible embodiment, the amplitude of the lateral motion component imposed on the grain pan 7 is determined on the basis of the output of one or more sensors configured to measure operational parameters of the harvester. These parameters may be one or more of the following non-limiting list of parameters: layer thickness of the grain-chaff layer on the grain pan 7, stratification of the layer on the grain pan, and thickness of the grain portion of the stratified layer at or in the vicinity of the exit edge 11 of the grain pan, distribution of grains in the width direction of the grain pan.

Figure 7:
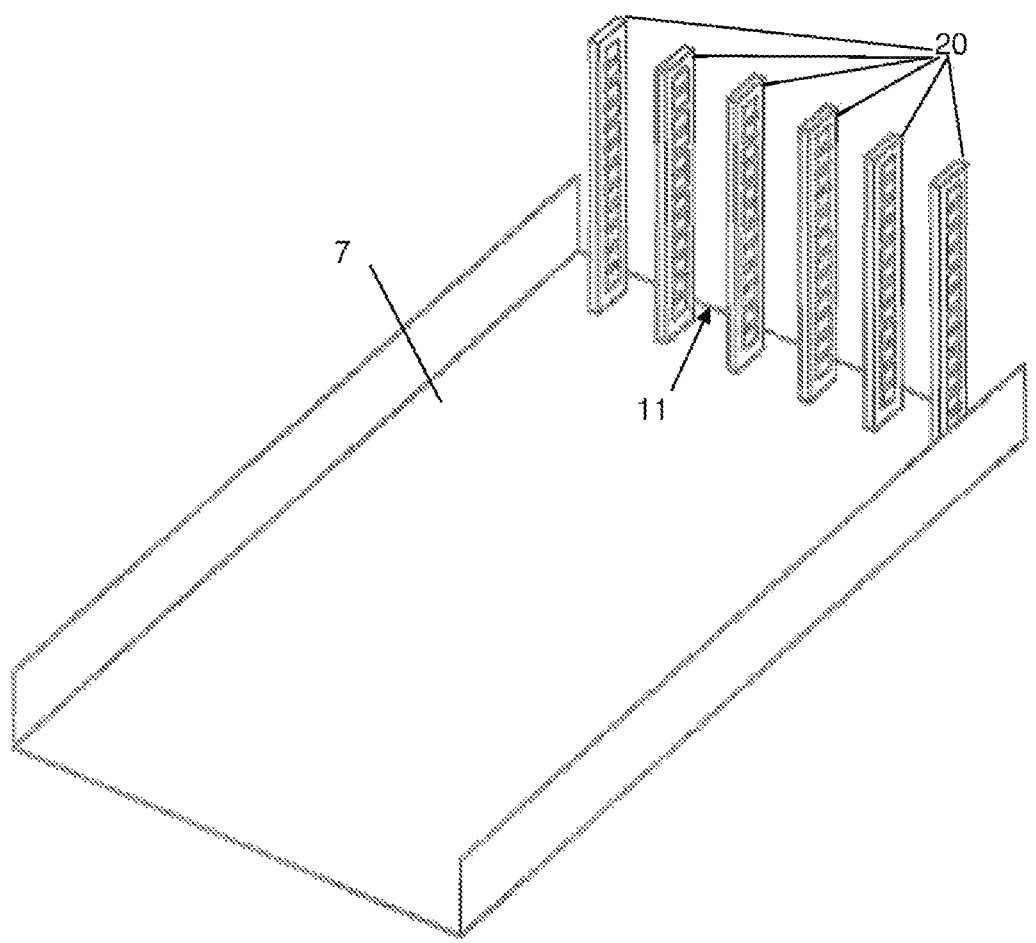
FIG. 7 shows an embodiment incorporating a plurality of sensors mounted on a grain pan for measuring the distribution of grains across the width of the grain pan.

These three parameters may be measured by sensors 20 mounted upright on the surface of the grain pan and oriented in the longitudinal direction of the harvester, as described with reference to FIGS. 3 to 6. The distribution of the layer thickness in the width direction can be measured by mounting a plurality of sensors 20 across the width of the grain pan, in the vicinity of the exit edge 11 of the grain pan 7, as illustrated in FIG. 7 side inclination angle of the harvester.

The amplitude of the lateral motion component may be controlled automatically on the basis of these one or more parameters according to a suitable algorithm, implemented in a control unit that is electrically coupled to and receives inputs from one or more sensors and produces an output signal calculated by the algorithm. The invention is specifically related to a method for controlling the reciprocating motion of the grain pan of a harvester according to the invention, wherein the thickness is measured of the grain portion of the stratified layer in the vicinity of exit edge 11 of the grain pan 7, at a plurality of locations across the width of the grain pan (e.g. by a sensor arrangement as shown in FIG. 7). The amplitude of the lateral motion component imposed on the grain pan is controlled by the control unit, in order to minimize the difference between the measured grain layer thicknesses at the plurality of locations.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester, comprising:
   a threshing assembly comprising one or more threshing rotors mounted in the harvester;
   a grain pan configured to:
      receive a mixture of grains and chaff from the threshing assembly; and
      undergo a reciprocating motion in a longitudinal direction of the harvester;
   one or more sieves configured to:
      receive a layer of grains and chaff from the grain pan; and
      undergo a reciprocating motion in the longitudinal direction of the harvester;
   a drive mechanism coupled to the grain pan and configured to drive the longitudinal reciprocating motion of the grain pan, and further configured to superimpose on said longitudinal reciprocating motion a lateral reciprocating motion component;
   a plurality of sensors configured to measure a thickness of a grain portion of a stratified grain/chaff layer advancing on the grain pan towards an exit edge of the grain pan, said plurality of sensors being located in a vicinity of the exit edge and distributed at locations across a width of the grain pan; and
   a control unit electrically coupled to said sensors and configured to receive input signals representative of one or more parameters related to operation of the combine harvester, said control unit being further configured to:
      calculate a lateral motion component of the grain pan, as a function of said input signals, that minimizes a difference between the thickness of said grain portion of the grain/chaff layer measured by said plurality of sensors; and
      send a control signal to said drive mechanism, commanding the drive mechanism to superimpose the calculated lateral motion component on said longitudinal reciprocating motion of the grain pan.

2. The combine harvester according to claim 1, wherein the grain pan lacks partitions separated by dividers in the longitudinal direction of the harvester.

3. The combine harvester according to claim 1, wherein the sieves are configured to undergo said reciprocating motion only in the longitudinal direction of the harvester.

4. The combine harvester according to claim 1, wherein none of the one or more threshing rotors are mounted transversally to said longitudinal direction.

5. The combine harvester according to claim 1, wherein at least one of said sensors comprises a support structure and a plurality of sensor elements mounted as a stack of sensor elements on the support structure, the sensor being configured to be mounted on the grain pan so that during use at least a portion of the stack of sensor elements is buried in or in close proximity to the grain/chaff layer, the sensor elements being configured to measure an electrical property that changes as a function of an immediate surroundings of the sensor elements, wherein the sensor elements are furthermore configured to be read out independently from each other.

6. The combine harvester according to claim 5, wherein the sensor elements are capacitive sensor elements or eddy current sensor elements.

7. The combine harvester according to claim 6, wherein the sensor elements are cylindrical in shape or flat in shape.

8. The combine harvester according to claim 6, wherein the sensor elements are capacitive sensor elements, comprising a first electrically conducting plate, a second electrically conducting plate, and a dielectric element located between and in contact with the plates, wherein the plates are mounted in the same vertical plane when the at least one of said sensors is placed on a horizontal surface.

9. The combine harvester according to claim 5, wherein the support structure is a flat element configured to be mounted upright, and wherein the sensor elements are attached to or incorporated in the flat element.

10. The combine harvester according to claim 5, wherein the support structure consists of or comprises a PCB board incorporating wiring connected to or connectable to the sensor elements and connected to or connectable to read-out means and power means for reading out and supplying power to the sensor elements.

11. The combine harvester according to claim 10, wherein the sensor elements are themselves incorporated in the PCB board.

12. The combine harvester according to claim 5, wherein the at least one of said sensors is configured to measure the thickness of a grain/chaff layer comprising a particular type of grain, wherein a size of the sensor elements essentially corresponds to an average size of said particular type of grain.

13. The combine harvester according to claim 1, wherein said one or more threshing rotors is mounted in said longitudinal direction of said harvester.

* * * * *